Oct. 4, 1966 R. M. PADELLFORD 3,276,147
HEART-LUNG RESUSCITATION TRAINING DEVICE
Filed Jan. 17, 1964
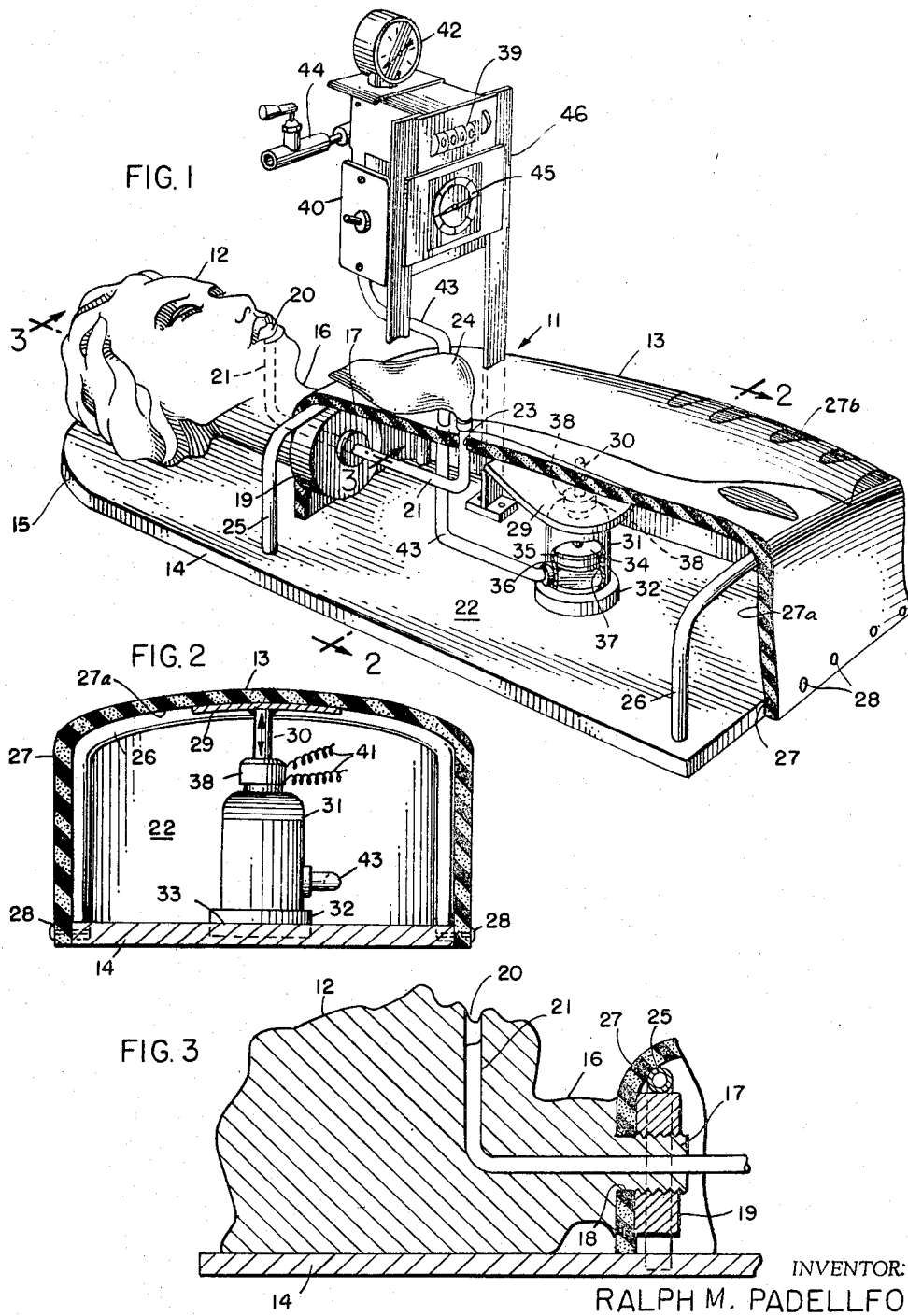
INVENTOR:
RALPH M. PADELLFORD
BY
Dawson, Tilton, Fallon, Lungmuss & Alexander
ATT'YS

# United States Patent Office 3,276,147
Patented Oct. 4, 1966

3,276,147
HEART-LUNG RESUSCITATION TRAINING DEVICE
Ralph M. Padellford, Nevada, Iowa, assignor to Iowa State University Research Foundation, Inc., Ames, Iowa, a corporation of Iowa
Filed Jan. 17, 1964, Ser. No. 338,335
1 Claim. (Cl. 35—17)

This invention relates to a training appartus and, more particularly, to an apparatus which includes a simulated chest, sternum and respiratory system for providing individuals with an opportunity to practice, and thereby become proficient in heart-lung resuscitation.

The invention described herein was made or conceived in the course of or under a contract with the United States Atomic Energy Commission.

Heart-lung resuscitation is an emergency first aid procedure that combines artificial circulation and artificial respiration. Briefly this involves a rythmic inflation of a victim's lungs to oxygenate the blood which is circulated by external or closed chest cardiac massage. The effective application of heart-lung resuscitation is a skillful technique which can only be accomplished by individuals who have had experience and training in all the intricacies of this life saving procedure. The obtaining of this experience however, presents certain problems since closed chest cardiac massage should never be applied to a person whose heart is beating.

A brief explanation of the techniques of heart-lung resuscitation is included in this application since it is essential for a complete understanding of this invention and its operation.

One phase of heart-lung resuscitation, artificial circulation, is produced by closed chest cardiac massage, a recently developed and highly successful first aid method for keeping an inert heart pumping blood indefinitely. In applying closed chest cardiac massage the victim is first laid on a hard surface in a face-up position. The operator then places the heel of one of his hands on the lower part of the victim's sternum and his other hand over the first while firmly pushing on the sternum. If the victim is a child one hand can be used to push on the sternum while the other is slipped under the back to provide additional support.

Since the ribs are attached to the sternum with flexible cartilage, the chest can be compressed, squeezing the heart between the sternum and spinal column and forcing the blood out of the heart ventricles. When the pressure is released the chest re-expands and the heart refills with blood. This cycle should be repeated 60 to 80 times per minute for adults, and 80 to 100 times per minute for children. It is essential in closed chest cardiac massage that the operator be thoroughly trained and experienced since improper placement of the hands or excessive pressure can result in a fracture of ribs, laceration of the liver or regurgitation of the stomach contents into air passages.

The other phase of heart-lung resuscitation, artificial respiration, is generally performed by the mouth-to-mouth method. This is best accomplished by a second rescuer who produces lung inflations between every five cardiac compressions or, about 10 to 12 lung inflations per minute for an adult and 20 per minute for a child. In an emergency, a single individual can alternately inflate the lungs and compress the chest. When two rescuers are performing heart-lung resuscitation, proper timing between their individual functions is essential for adequate pulmonary ventilation and is mandatory in cases where there is a liquid or semi-liquid material in the lungs, air passages or stomach (i.e. drowning, pulmonary edema, etc.), as simultaneous application of cardiac massage and mouth-to-mouth respiration results in the stomach and pulmonary contents being discharged into the face of the rescuer performing the mouth-to-mouth respiration.

The present invention overcomes the above-described problems and disadvantages by providing a novel simulated human chest and respiratory system operatively associated with one another for selective conjoint action, thereby enabling individuals to become experienced in the proper application of heart-lung resuscitation.

It is therefore the object of the present invention to provide an improved training device.

A further object of the present invention is to provide a simulated chest and sternum for training individuals in closed chest cardiac massage.

A still further object of the present invention is to provide a device having a simulated respiratory system for training individuals in artificial respiration.

A yet further object of the present invention is to provide a simulated human chest and sternum operatively connected to a pressure sensitive recording means for measuring forces applied to the sternum.

And yet a further object of the present invention is to provide a simulated human chest and sternum operatively associated with a simulated human respiratory system for training individuals in hear-lung resuscitation.

Other objects and advantages of this invention may be seen in the details of construction and operation set down in this specification.

The invention is described in conjunction with the accompanying drawing, in which:

FIG. 1 is fragmentary perspective view of an embodiment of the invention;

FIG. 2 is a sectional view taken along the line 2—2 of FIG. 1; and

FIG. 3 is sectional view taken along the line 3—3 of FIG. 1.

In the illustration given and with particular reference given to FIG. 1, the numeral 11 generally designates a hear-lung resuscitation training device constructed in accordance with principles of the present invention, comprising a manikan head 12 securely connected to a simulated human chest 13 mounted on a flat plywood base 14. The rigid base 14 may be advantageously curved at one end 15 to avoid injuring the operators.

The manikin head 12 includes a neck portion 16 and a threaded stud 17 which extends through a hole 18 in the chest 13 and which is adapted to receive a threaded locking disc member 19 for rigidly connecting the head 12 to the chest 13.

A simulated respiratory system is provided by a mouth 20 in the head 12 opening into a tubular conduit 21, which conduit in turn extends into a chest cavity 22 terminating outwardly thereof adjacent an aperture 23 in the chest 13. An expansible bladder 24, advantageously composed of a gas impervious resilient material, such as rubber, is sealed to the end of said conduit 21 and acts to simulate a human lung when air is discharged thereinto through the mouth 20 and conduit 21.

The chest construction includes a pair of oppositely spaced U-shaped frame members 25 and 26 securely embedded in the plywood base 14 to provide a rigid support for a flexible cover 27, composed of a ½" thick sheet of resilient material such as foam rubber which is tautly secured to the sides of the base 14 by means of a plurality of screws or tacks 28. An alternative construction for the chest can be employed by using large sections of sponge rubber to form the torso in place of the U-shaped frame members 25 and 26. The sponge rubber torso can then be covered with a rubber or plastic sheet which can be secured to the base in the same manner as the previously described cover 27. If desired, a silhouette of a human chest cage may be imprinted on the rubber sheet or cover 27 as at 27b.

Centrally located within the chest cavity and embracing the inner surface 27a of the cover 28 is a metal plate 29, shaped to simulate a human sternum or breast bone, rigidly connected as by welding to one end of an outwardly extending shaft 30 of a compression chamber unit 31. The unit 31 is secured to the base 14 by means of a radially outwardly extending flange 32 which is snugly received in a well 33 formed in said base.

The interior construction of the compression chamber unit includes a piston 34 slideably mounted in the unit 31 and rigidly secured to the other end of the shaft 30. A pair of O rings 35 and 36 are provided around the outer periphery of the piston 34 for insuring sealing engagement with the inner wall 37 of the combustion chamber unit 31. A guide member or collar 38 is provided and acts to control the movement of the shaft 30 along a single predetermined vertical axis. In addition, the guide member 38 also functions to limit the travel of the plate 29 so that its freedom of movement simulates that of a human sternum.

A counter for indicating the number of thrusts applied to the sternum-shaped plate 29 is provided by means of a microswitch (not shown) positioned in the collar 38 and connected to a counter 39 through a switch 40 by a pair of wires 41.

The amount of force imparted to the sternum shaped plate 29 is measured by a pressure gage 42 which communicates with the compression chamber unit 31 by means of a tubular conduit 43 that terminates in a valve assembly 44.

An interval timer 45, preferably having a second hand, operates in conjunction with the counter 39 and pressure gage 42 to indicate whether closed chest cardiac massage is being applied at the proper rate and with the desired degree of force. Inspection of these instruments is facilitated by mounting them on a common frame support 46 as is illustrated in FIG. 1. This support 46 can be secured to the base 14.

In operation, the heart-lung resuscitation training device 11 should be placed on a hard flat surface. The operator who is to apply closed chest cardiac massage then places his left hand on top of his right hand and presses with the heel of his right hand, in a vertically downward direction on the human chest 13 directly above the location of the sternum-shaped plate 29. Releasing of the plate 29 by a slight lifting of the hands enables said plate to return to its original position. At the same time, a second operator can apply mouth-to-mouth respiration. The rescuer applying closed chest cardiac massage can, by observing the counter 39, pressure gauge 42 and interval timer 45, determine whether he is applying the correct amount of force to the sternum-shaped plate 29 at the proper frequency. In this manner individuals are able to obtain actual experience in heart-lung resuscitation enabling them to skillfully apply this first-aid procedure when an emergency arrives.

Through the use of the device shown, I find that the training of individuals is materially expedited since the operators work in pairs, having the means for indicating their effectiveness prominently before them. Further, the arrangement of parts gives an immediate signal, more properly, sensation to the operator, if the resuscitation is not being performed within tolerable limits. In this connection, it is significant to note that the sternum-duplicating parts are particularly advantageous in developing the necessary proficiency, the plate 29 being a truncated arcuate shape, the movement of which is limited by the collar 38.

It will be understood that this embodiment of the invention has been used for illustrative purposes only and that other modifications and variations in the invention may be effected without departing from the spirit and scope of the novel concepts hereof.

I claim as my invention:

A heart-lung resuscitation training device, comprising an elongated base adapted to be disposed generally horizontally, a compression chamber unit mounted on said base having an upwardly-projecting shaft, a relatively rigid plate mounted on said shaft and disposed generally horizontally whereby depression of said plate depresses said shaft to cause said unit to emit a sensible signal, said plate being sized to accommodate manual pressure from the superposed hands of a trainee, a flexible cover-equipped framework secured to said base and enclosing said plate, shaft and unit, said framework being shaped to correspond to a human chest, said base projecting beyond said framework in one longitudinal direction to accommodate a manikin head, a superstructure supported on said base adjacent said manikin head, a counter, a timer, and a pressure gauge mounted on said superstructure for observation by a trainee having his hands in position to depress said plate, and conduit means coupling said pressure gauge and counter with said unit for sensing signals therefrom and presenting the same for direct visual observation by said trainee.

References Cited by the Examiner

UNITED STATES PATENTS

| 2,451,200 | 10/1948 | Church | 35—17 |
| 3,068,590 | 12/1962 | Padellford | 35—17 |
| 3,209,469 | 10/1965 | James | 35—17 |

FOREIGN PATENTS

| 1,308,180 | 9/1962 | France. |
| 791,741 | 3/1958 | Great Britain. |

EUGENE R. CAPOZIO, *Primary Examiner.*

JEROME SCHNALL, *Examiner.*

HARLAND S. SKOGQUIST, *Assistant Examiner.*